(12) United States Patent
Matsui et al.

(10) Patent No.: US 10,732,843 B2
(45) Date of Patent: Aug. 4, 2020

(54) TAPE DRIVE DATA RECLAMATION

(71) Applicant: INTERNATIONAL BUSINESS MACHINES CORPORATION, Armonk, NY (US)

(72) Inventors: Sosuke Matsui, Higashimurayama (JP); Tohru Hasegawa, Tokyo (JP); Tsuyoshi Miyamura, Yokohama (JP); Noriko Yamamoto, Tokyo (JP); Shinsuke Mitsuma, Machida (JP); Hiroshi Itagaki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/013,108

(22) Filed: Jun. 20, 2018

(65) Prior Publication Data
US 2019/0391743 A1 Dec. 26, 2019

(51) Int. Cl.
*G06F 3/06* (2006.01)
*G06F 16/11* (2019.01)

(52) U.S. Cl.
CPC ............ *G06F 3/0608* (2013.01); *G06F 3/068* (2013.01); *G06F 3/0647* (2013.01); *G06F 3/0682* (2013.01); *G06F 3/0685* (2013.01); *G06F 3/065* (2013.01); *G06F 3/0652* (2013.01); *G06F 16/119* (2019.01)

(58) Field of Classification Search
None
See application file for complete search history.

(56) References Cited

U.S. PATENT DOCUMENTS

| | | | |
|---|---|---|---|
| 6,718,427 B1 * | 4/2004 | Carlson | G06F 3/0617 360/48 |
| 6,816,941 B1 * | 11/2004 | Carlson | G06F 3/0607 711/111 |
| 7,275,075 B2 | 9/2007 | Cannon | |
| 7,710,681 B2 | 5/2010 | Itagaki et al. | |
| 8,341,346 B2 | 12/2012 | Ashton et al. | |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Jared I Rutz
*Assistant Examiner* — Marwan Ayash
(74) *Attorney, Agent, or Firm* — L. Jeffrey Kelly

(57) ABSTRACT

The method, computer program product, and computer system may include a computing device which may generate a list of data to be copied from a plurality of source media to a target medium. The computing device may identify a first type of data in the generated list of data with the first type of data being pre-migrated data. The computing device may reclaim the first type of data from a primary storage tier to the target medium with the target medium being associated with the first drive. The computing device may identify a second type of data in the generated list of data, the second type of data being migrated data, and reclaim the second type of data from at least one secondary source medium to the target medium using the first drive and a second drive. The secondary source medium may be associated with the second drive.

20 Claims, 8 Drawing Sheets

(56) References Cited

U.S. PATENT DOCUMENTS

| | | |
|---|---|---|
| 8,554,808 B2 | 10/2013 | Fukatani et al. |
| 8,738,588 B2 | 5/2014 | Cannon et al. |
| 8,930,617 B2 | 1/2015 | Haustein et al. |
| 8,935,469 B2 | 1/2015 | Haustein et al. |
| 9,025,261 B1 | 5/2015 | Hasegawa et al. |
| 9,087,549 B2 | 7/2015 | Katagiri et al. |
| 9,213,496 B2 | 12/2015 | Gibble et al. |
| 9,557,928 B2 | 1/2017 | Haustein et al. |
| 9,600,493 B1* | 3/2017 | Hasegawa .............. G06F 3/0686 |
| 2010/0049834 A1 | 2/2010 | Maruyama et al. |
| 2012/0179868 A1 | 7/2012 | Haustein et al. |
| 2015/0022917 A1 | 1/2015 | Ashida et al. |
| 2015/0055241 A1 | 2/2015 | Abe et al. |
| 2015/0309748 A1 | 10/2015 | Haustein et al. |
| 2016/0063007 A1* | 3/2016 | Iwasaki ................. G06F 16/119 707/645 |
| 2016/0077750 A1* | 3/2016 | Erdmann .............. G06F 3/0647 711/114 |
| 2017/0031603 A1* | 2/2017 | Hasegawa ............. G06F 3/0608 |
| 2017/0083437 A1 | 3/2017 | Hasegawa |
| 2017/0153820 A1 | 6/2017 | Hasegawa |
| 2018/0157413 A1 | 6/2018 | Kawamura |
| 2018/0314632 A1 | 11/2018 | Krishnamurthy |

OTHER PUBLICATIONS

Disclosed Anonymously, "Method for Tape to Cloud Reclamation and Defragmentation", IP.com Prior Art Database Technical Disclosure, IP.com No. IPCOM000239024D, Publication Date: Oct. 1, 2014, pp. 1-2.

IBM: List of IBM Patents or Patent Applications Treated as Related (Appendix P), Jul. 10, 2018, pp. 1-2.

Pending U.S. Appl. No. 16/013,123, filed Jun. 20, 2018, entitled "Tape Drive Data Reclamation", pp. 1-51.

* cited by examiner

TAPE DRIVE DATA RECLAMATION

BACKGROUND

The present invention relates generally to a method, system, and computer program for tape drive data reclamation. More particularly, the present invention relates to a method, system, and computer program for shortening a period of time during which two drives are simultaneously used during data reclamation.

Hierarchical storage management (HSM) is a known technology that realizes efficient use of a limited storage capacity. HSM is a scheme for arranging data that is frequently referred to in a high-speed and high-cost primary storage unit, such as a redundant array of independent disks (RAID) and a solid state drive (SSD), and arranging data that is referred to less frequently in a low-speed and low-cost secondary storage unit. HSM may be implemented in, for example, IBM® products such as the TS7700 Virtualization Engine and IBM® Spectrum Archive™ Enterprise Edition.

A state where a certain piece of data is only stored in a primary storage unit is called a "resident" state, a state where a certain piece of data is stored not only in the primary storage unit but also in a secondary storage unit is called a "pre-migrated" state, and a state where a certain piece of data is only stored in the secondary storage unit is called a "migrated" state. For example, all pieces of TS7700 data are first stored in the primary storage unit and thus placed in the resident state. After several minutes, the pieces of data are copied to the secondary storage unit and thus placed in the pre-migrated state. The pieces of data will be then be fully moved to the secondary storage unit when the system has only a very little disk space remaining; thus placing the pieces of data in the migrated state.

Storage products such as the IBM® TS7700 Virtualization Engine and IBM® Spectrum Archive™ Enterprise Edition adopt a magnetic tape as the secondary storage unit. When a certain piece of data is written to a magnetic tape, which is a sequential-access medium, and the same piece of data is subsequently updated, the piece of data that has been updated is appended to the end of the tape while the previous data is handled as an invalid area. When updates to the data frequently occur, the proportion of the invalid area increases, causing relative decrease in the capacity of the tape.

As a scheme for solving this problem, a technique called reclamation is known. Reclamation is a technique of only reading valid data from a tape that includes an invalid area and writing the valid data that has been read to another tape. Reclamation requires two tape drives, for the source tape from which the target data should be read and the destination tape to which the data that has been read should be written should be simultaneously accessed. In recent years, due to the increase in magnetic tape capacity, reclamation processing takes longer and the two tape drives are occupied longer, which is now recognized as a drawback of the technique. For example, the data transfer rate to a tape compatible with an IBM® TS1150 tape drive is up to 360 megabytes per second. When data is to be read from a tape medium of 10 terabytes using two TS1150 tape drives to carry out reclamation, then the two drives may be occupied for about eight hours (=10 (TB)/360 (MB/sec)).

The present invention solves the problem of prolonged occupation time of the two drives in the course of the reclamation processing.

BRIEF SUMMARY

An embodiment of the invention may include a method, computer program product and computer system for copying data from source media to target media in a storage system. The method, computer program product, and computer system may include a computing device which may generate a list of data to be copied from a plurality of source media to a target medium. The computing device may identify a first type of data in the generated list of data with the first type of data being pre-migrated data. The computing device may reclaim the first type of data from a primary storage tier to the target medium with the target medium being associated with the first drive. The computing device may identify a second type of data in the generated list of data, the second type of data being migrated data and reclaim the second type of data from at least one secondary source medium to the target medium using the first drive and a second drive. The secondary source medium may be associated with the second drive.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise. Now, the present invention will be described using particular embodiments, and the embodiments described hereafter are understood to be only referred as examples and are not intended to limit the scope of the present invention.

One or more embodiments according to the present invention are directed to methods, computer systems, storage systems and computer program products for reclaiming data from a source medium to a target medium in a storage system.

Figure 1:
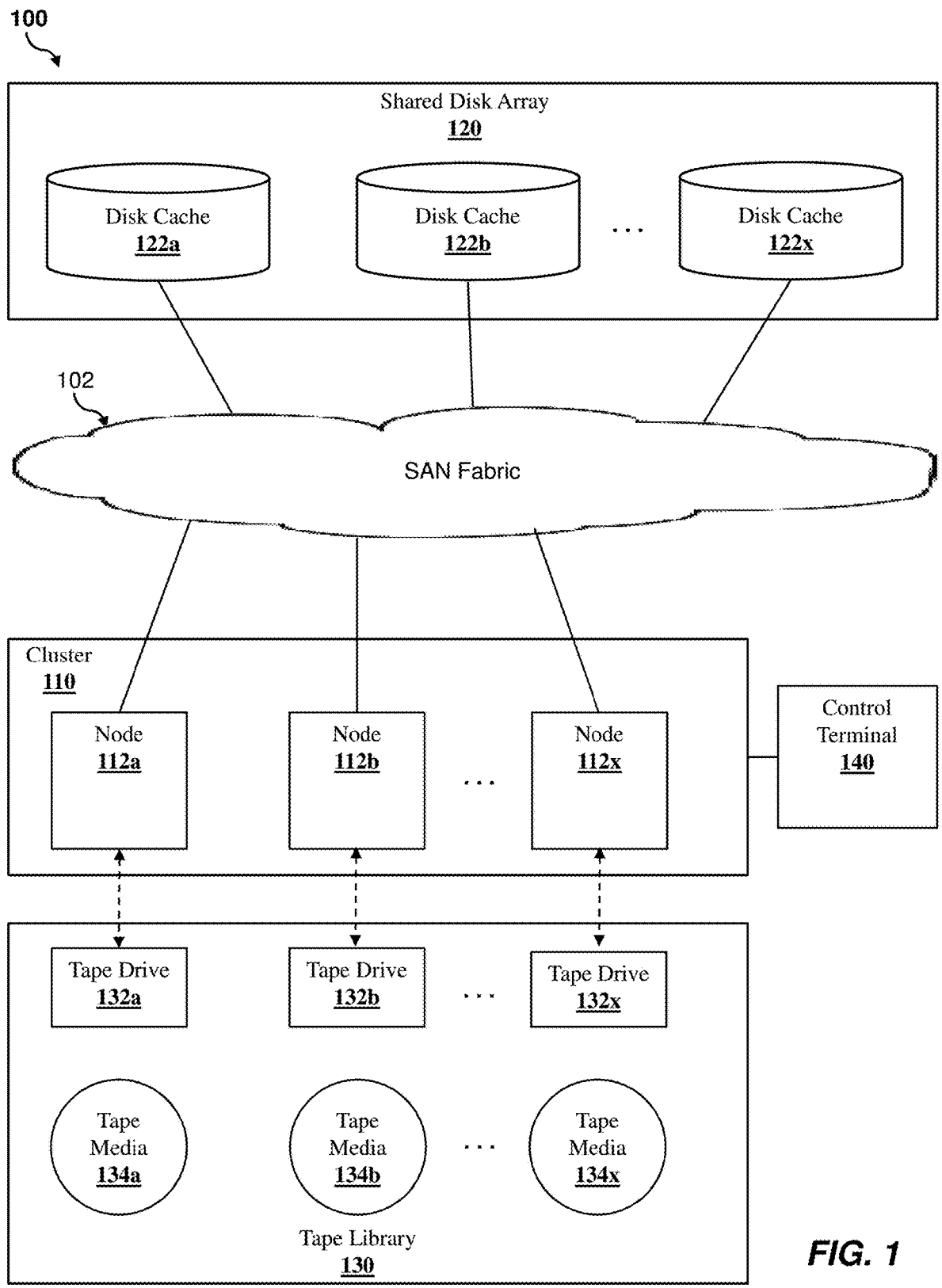
FIG. 1 illustrates an overview of a hierarchical storage system, in accordance with an embodiment of the invention.
Figure 2:
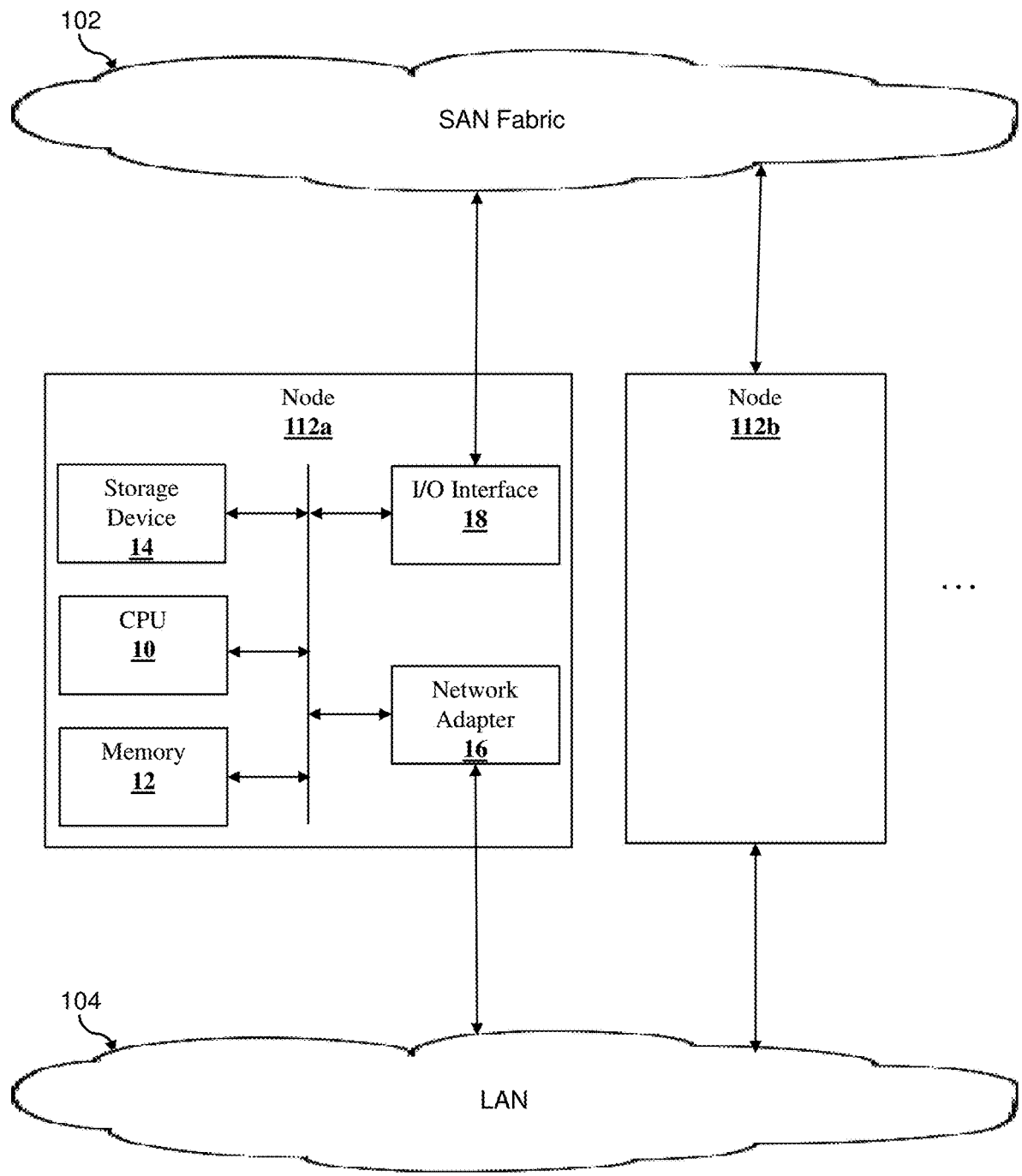
FIG. 2 is a block diagram which illustrates a node constituting a cluster of the hierarchical storage system, in accordance with an embodiment of the invention.
Figure 3:
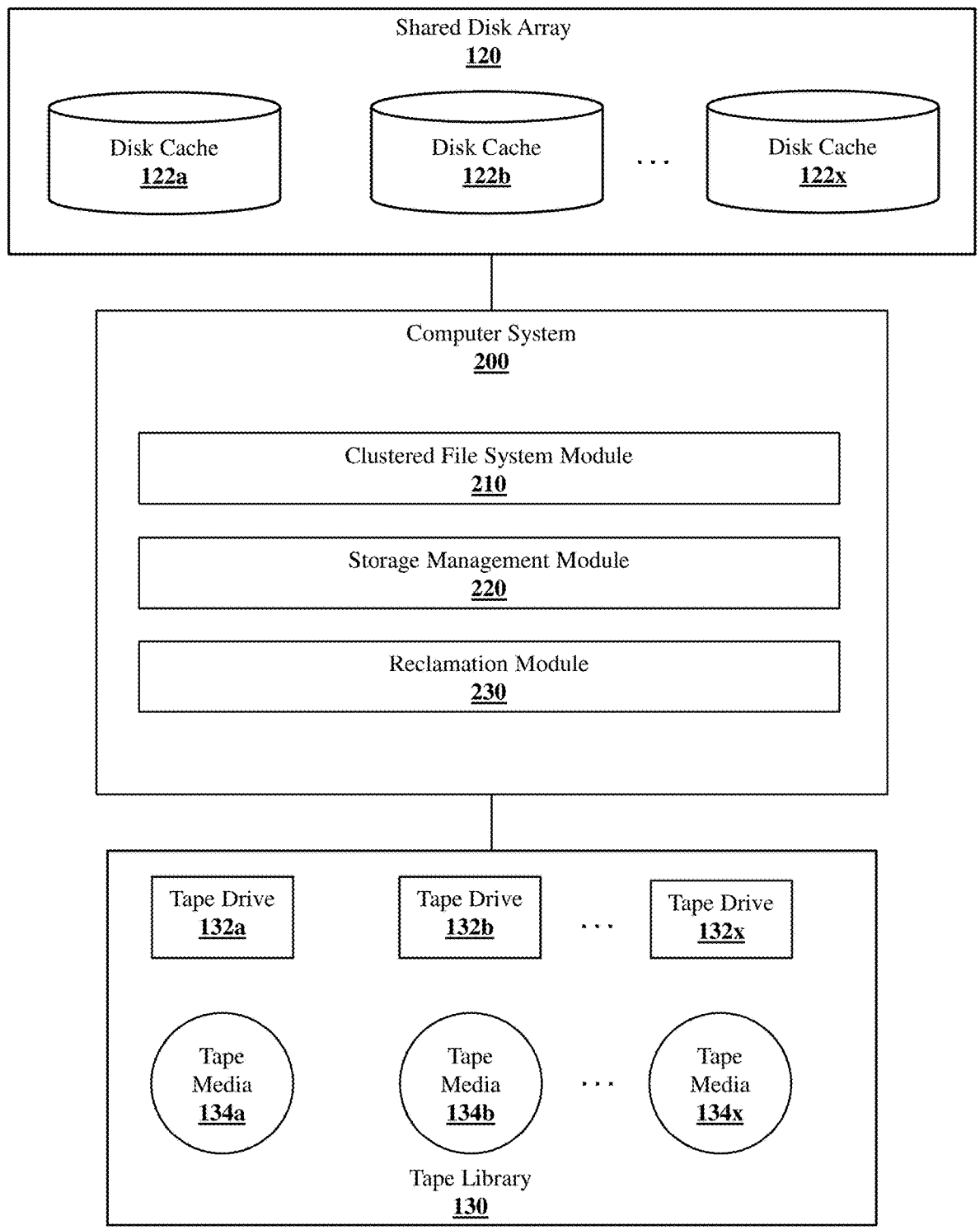
FIG. 3 is a block diagram which illustrates the hierarchical storage system, in accordance with an embodiment of the invention.

Referring to series of FIGS. 1-3, a hierarchical storage system with disk and tape tiers according to an exemplary embodiment of the present invention is described.

FIG. 1 illustrates an overview of the hierarchical storage system 100, in accordance with an embodiment of the invention. The hierarchical storage system 100 includes a cluster 110 with one or more nodes 112a-112x. The cluster 110 provides a file system that allows for performing file operations to the hierarchical storage system 100.

As shown in FIG. 1, the hierarchical storage system 100 may include a primary storage tier, shared disk array 120 that includes one or more disk caches 122a-122x, which are storage devices storing files. Each node 112 in the cluster 110 may be connected to the disk cache 122a-122x in the shared disk array 120 via a SAN (Storage Area Network) fabric 102. The SAN fabric 102 may include, but not limited to, FC (Fibre Channel)—SAN based on a fiber channel network and/or IP (Internet Protocol)—SAN based on TCP (Transmission Control Protocol)/IP network with LAN (Local Area Network) switches.

The nodes 112a-x may share the disk caches 122a-122x. The nodes 112a-x can access to the disk cache 122a-122x via the SAN fabric 102 and provide also indirect file access for other nodes that do not connect to the SAN fabric 102. Such file system distributed to the one or more nodes 112a-112x in the cluster 110, to which plurality of nodes (may include client nodes) can access, is so called a clustered file system or a distributed parallel file system. The clustered file system can provide a global namespace, a striping functionality to stripe input and output over the nodes and an information lifecycle management (ILM) functionality.

The hierarchical storage system 100 may include further secondary storage tier, tape library 130. The tape library 130 includes one or more tape drives 132a-132x and one or more tape media 134a-134x. Any tape medium 134a-134x can be a medium for either source or target of copy operations. Each node 112a-112x in the cluster 110 may be connected to the tape library 130 via SAN fabric, FC LVD (Low Voltage Differential) SCSI (Small Computer System Interface) or SAS (Serial Attached SCSI) cables. Equipping the plurality of the tape drives 132a-132-x enables the node 112a-112x to access a set of the tape media 134a-134x simultaneously. The tape drive 132a-132x may be occupied by the node at a point in time and may be used alternately. The tape drives 132a-132x may accept LTO (Linear Tape-Open) Ultrium 5 or later tape cartridges, which support LTFS (Liner Tape File System™), or other proprietary formats.

The tape library 130 is managed by the computer system 200, which may be a tape file system such as, but not limited to, LTFS (Liner Tape File System™) and integrated to the clustered file system so that at least part of data in the shared disk array 120 is stored on tape media 134a-134x in the tape library 130. Files may migrate from the shared disk array 120 to the tape library 130 based on a predetermined migration policy.

The hierarchical storage system 100 may include further a control terminal 140. The control terminal 140 is a terminal device where an administrative user can operate to issue manual request and to specify settings of the hierarchical storage system. By using the control terminal 140, the administrative user can specify settings of a novel reclamation and/or inter-generation copy process according to the exemplary embodiment of the present invention, which will be described in more detail later. The administrative user can also issue manual request and specify schedules or policies for other functionalities of the hierarchical storage system 100 such as standard migration, recall, reconciliation, file placement, file management, etc.

As shown in FIG. 1, in the describing embodiment, the nodes 112a-112x are described to be connected to the disk caches 122a-122x in the shared disk array 120 and the nodes 112a-112x are described to be connected to the tape drives 132a-132x in the tape library 130. However, the configuration of the hierarchical storage system 100 shown in FIG. 1 is only an example for typical storage system and is not intended to suggest any limitation.

For instance, in a particular embodiment, the shared disk array 120 may be divided to one or more online storages and one or more nearline storages to construct a three or more tiered architecture. In another particular embodiment, the hierarchical storage system may include further a flash storage tier on top of the hierarchical storage system. In further other embodiment, the storage system may have merely one node, one disk cache and one tape drive to construct a hierarchical storage system. In further another embodiment, another type of a sequential access medium may be used as a storage medium for both source and target in place of or in addition to the tape medium.

FIG. 2 illustrates a schematic diagram of an example node in accordance with an example embodiment of the invention. The node 112a is only one example of a suitable node and is not intended to suggest any limitation as to the scope of use or functionality of embodiments of the invention described herein. Regardless, the node 112a is capable of being implemented and/or performing any of the functionality set forth herein.

The node 112a is operational with numerous other general purpose or special purpose computing system environments or configurations. Examples of well-known computing systems, environments, and/or configurations that may be suitable for use with the node 112a include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The node 112a may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 2, the node 112a is shown in the form of a general-purpose computing device. The components of the node 112a may include, but are not limited to, one or more processors (or processing units) 10 and a memory 12 operatively coupled to the processors 10 by a bus including a memory bus or memory controller, and a processor or local bus using any of a variety of bus architectures.

The node 112a typically includes a variety of computer system readable media. Such media may be any available media that is accessible by the node 112a, and it includes both volatile and non-volatile media, removable and non-removable media.

The memory 12 can include computer system readable media in the form of volatile memory, such as random access memory (RAM). The node 112a may further include other removable/non-removable, volatile/non-volatile computer system storage media. By way of example only, the storage device 14 can be provided for reading from and writing to a non-removable, non-volatile magnetic media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, the storage device 14 may include at least one program product having a set (e.g., at least one) of program modules that are configured to carry out the functions of embodiments of the invention.

Program/utility, having a set (at least one) of program modules, may be stored in the storage device 14 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The node 112a may also communicate with one or more peripherals such as a keyboard, a pointing device, etc.; a display; one or more devices that enable a user to interact with the node 112a; and/or any devices (e.g., network card, modem, etc.) that enable the node 112a to communicate with one or more other computing devices via SAN fabric 102. Such communication can occur via Input/Output (I/O) interfaces 18. Still yet, the node 112a can communicate with one or more networks such as a local area network (LAN) 104, a general wide area network (WAN), and/or a public network (e.g., the Internet) via the network adapter 16. As depicted, the network adapter 16 communicates with the other components of the node 112a via bus. It should be understood that although not shown, other hardware and/or software components could be used in conjunction with the node 112a. Examples, include, but are not limited to: microcode, device drivers, redundant processing units, external disk drive arrays, RAID systems, tape drives, and data archival storage systems, etc. The node 112a may be interconnected with another node 112 via a host channel adapter (HCA) such as InfiniBand (™).

Hardware and/or software components of the tape library 130, the tape drives 132a-132x, the control terminal 140 may include, similar to the node 112a shown in FIG. 2, a processor, a memory, a read only memory, a network adapter, a I/O interface, and robotic mechanism, but not be shown in the drawings any more.

FIG. 3 illustrates a block diagram of the hierarchical storage system 100 is. As shown in FIG. 3, the hierarchical storage system 100 includes a computer system 200 connected to the shared disk array 120 and the tape library 130.

The computer system 200 may be composed of the nodes 112a-112x in the cluster 110 shown in FIG. 1 and FIG. 2.

As shown in FIG. 3, the computer system 200 includes a clustered file system module 210; a storage management module 220; a reclamation module 230; and a tape file system module 250.

The clustered file system module 210 may be a software component that manages the clustered file system on the shared disk array 120 in the hierarchical storage system 100. The tape file system module 250 may be a software component that allows for performing file operations to the tape media 134a-134x and providing interface to manipulate files on the tape media 134a-134x in the tape library 130. The tape media 134a-134x in the tape library 130 may be accessed as subdirectories under a mount point of the tape library 130.

The storage management module 220 may be a software component that provides integration of the clustered file system managed by the clustered file system module 210 with the tape file system managed by the tape file system module 250. The storage management module 220 manages standard migration and recall activities in the hierarchical storage system 100.

The reclamation module 230 may be a software component that provides the novel reclamation function according to one or more embodiments of the present invention.

Before describing the novel reclamation function in detail, normal functionalities including standard migration and recall in the hierarchical storage system 100 will be described.

Migration is a process in which files are moved from the shared disk array 120 to the tape media 134a-134x on the tape library 130. The migration process may have plurality of modes. In a first mode, the migration process leaves behind a small stub file on the shared disk array 120, which points the file body migrated to the tape medium. The migration process in a second mode is so-called as a pre-migration, in which files are moved from the shared disk array 120 to the tape media 134a-134x on the tape library 130 without replacing the file body with a stub file on the shared disk array 120. According to the pre-migration mode, identical copies of the files are on both the disk and tape tiers, i.e. shared disk array 120, tape library 130. Recall is a process in which the migrated files are moved from the tape media 134a-134x back to the originating shared disk array 120 if an accessed file does not exist on the shared disk array 120.

The files newly created or overwritten to the hierarchical storage system 100 may initially be merely on the shared disk array 120, thus the file state is initially "resident". The files may be migrated from the shared disk array 120 to the tape library 130 by running the migration process in first mode, after which the file is a stub on the disk and the identifiers of the tapes storing the copies are written to metadata. The file state of such file is referred to as "migrated". The file may be recalled from the tape library 130 by recall activities when an application attempts to read from the file. The file state of such file on both the disk and tape tiers, i.e. shared disk array 120 and tape library 130, is referred to as "pre-migrated". Also the files may be pre-migrated to the tape library 130 by running the migration process in second mode.

A desired reclamation function, e.g., in which the occupation time of the drives involved in reclamation is reduced by switching the storage media from which the source data to be reclaimed is read, is desired in some of the embodiments described herein.

Figure 4:
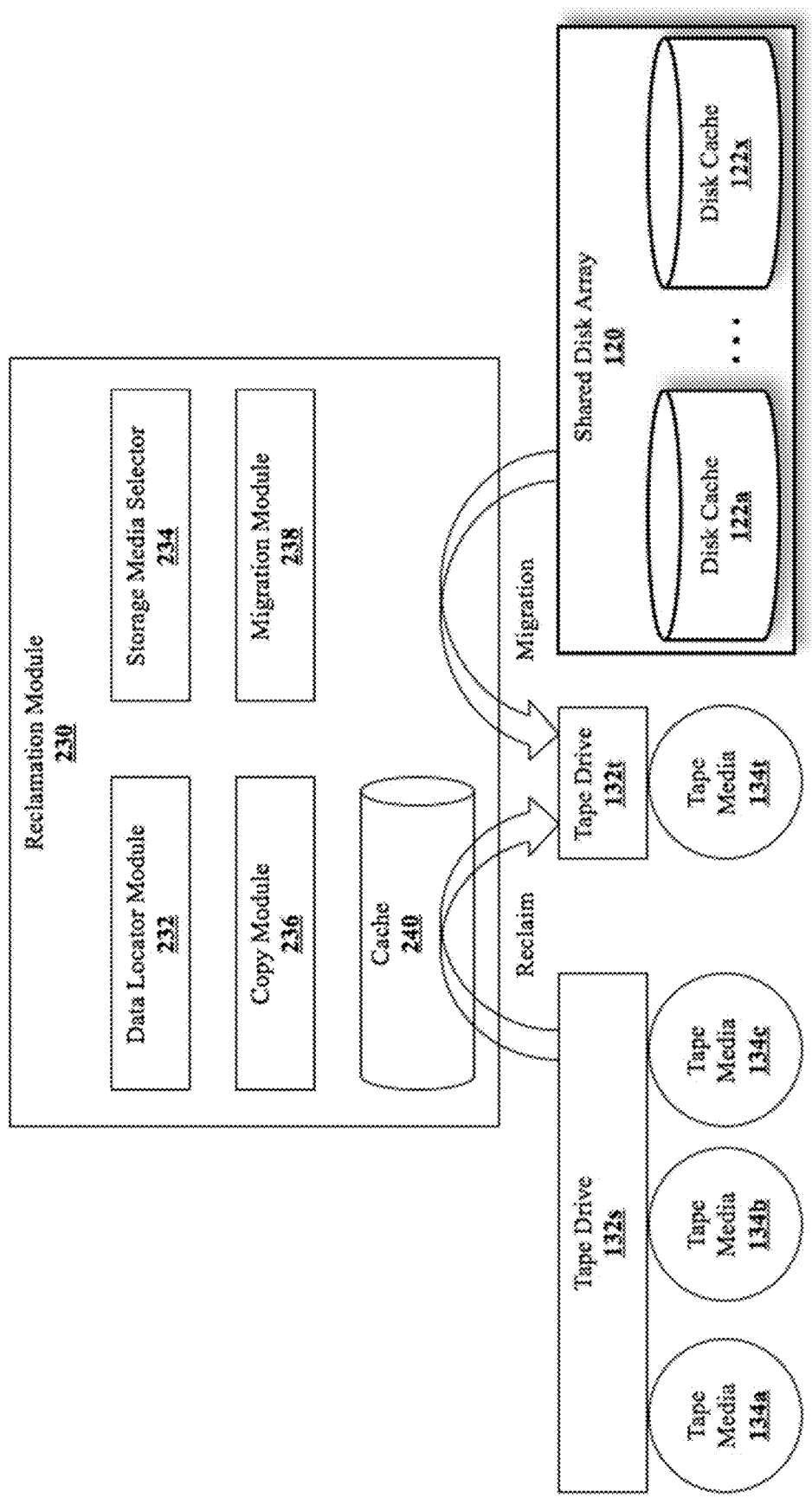
FIG. 4 is a block diagram which illustrates a reclamation module, in accordance with an embodiment of the invention.

FIG. 4 illustrates a block diagram of the reclamation module 230, in accordance with an embodiment of the invention. In FIG. 4, a detailed block diagram of the reclamation module 230 is depicted with other components related to the novel reclamation function, which include the tape file system module 250, the plurality of the tape drives 132a-132x, the plurality of the tape media 134a-134x, and the disk cache 122.

The tape medium that stores target files of reclamation is referred to as a source medium 134. The tape media that is used as a target (or destination) of the reclamation is referred to as a target medium 134t. For example, the tape drive 132 that holds the source medium 134, for example, 134a-134c, is referred to as a source tape drive 132S and the tape drive 132 that holds the target medium 134, for example, 134t, is referred to as a target tape drive 132t.

The reclamation is a process in which merely active data on the source medium 134a-134c is copied to the target medium 134t to defragment. Some particular implementations may automatically trigger the reclamation process when the ratio of the active data on the tape medium falls below a predetermined level. Since files stored on the shared disk array 120 are often moved to the tape library 130 using the plurality of the tape drives 132a-132x at once, data are typically written to multiple tape media 134a-134x evenly. Therefore, the multiple tape media 134a-134x may have to be involved in the reclamation process simultaneously. Further, disk cache 122a-122x in shared disk array 120 may be a source storage device that stores a plurality of files as a target for migration which is performed during the reclamation process. For example, disk cache 122a-122x may store data which is in a pre-migrated state, meaning the data is located both on the disk cache 122a-122x and one or more of the tape media 134a-c.

In this case, a lot of tape drives 132a-132x are occupied for the reclamation. Alternatively, the reclamation may continue for a long time when many tape media 134a-134x are processed by a single part of tape drive 132 in a one by one manner. Consequently, other operations such as the migrations and recalls may be prevented by drive occupation for the reclamation process. Therefore, embodiments described and/or suggested herein may preferably be capable of identifying the storage location of data to be reclaimed and switching between the plurality of storage locations such as source tape media 134a-134c, and disk cache 122a-122x from which tape drives 132s, 132t are reading the data to be reclaimed.

Although at least two tape drives 132s, 132t are preferably occupied during the reclamation process, the two tape drives 132s, 132t may not always be occupied at the same time. For example, if the data to be reclaimed is in a pre-migrated state, that pre-migrated data can be read directly from the disk cache 122a-122x to target media 134t by tape drive 132t. Thus, the period of time during which the two tape drives 132s, 132t are needed to be used at the same time can be shortened and the overall reclamation period can be shortened. For example, the IBM® TS7700 starts reclamation when the proportion of valid data to all data written to the tape becomes equal to or lower than 35 percent; i.e. only 35% of the data written on the tape drive is valid. If an IBM® 3592 JD medium having the capacity of 10 terabytes should be reclaimed and all pieces of data are read from the tape, it is necessary to read data of up to 3.5 terabytes (=10 TB*35%). Here, if the data has been successfully read at the maximum data transfer rate (360 MB/sec) of the IBM® TS1150 tape drive, then the conventional scheme will use the drive of the source of reclamation for about 2 hours 49 minutes 54 seconds (=3.5 (TB)/360 (MB/sec)). In contrast, if the source from which the data is reach is switched between the when the proposed scheme is used, the period of time during which the drives are needed to be used can be shortened in accordance with the proportion of the data in the pre-migrated state to all the data in the source tape to be reclaimed. For example, when 50 percent of 3.5 terabytes of data is also stored in the primary storage unit, it is made possible to shorten the period of time during which the drive of the source of reclamation is used to a 50 percent (=about 1 hour 25 minutes).

In one or more embodiments described herein, a novel reclamation function for reclaiming data from the source media 134 to the target media 134t, in which the tape drives 132s, 132t switch between the plurality of tape media 134a-134c and disk cache 122a-122x from which the data to be reclaimed is being read, may be described as being incorporated into the hierarchical storage system 100.

For this purpose, as shown in FIG. 4, the reclamation module 230 includes a data locator module 232, a storage media selector 234, a copy module 236 and a migration module 238. In an exemplary embodiment, a cache 240 (or buffer) for temporarily storing data transferred from the source tape media 134a-134c is also utilized. The disk cache 122 may be a source storage device that stores a plurality of files as a target for migration which is performed during the spare time of the reclamation process.

The data locator module 232 may be configured to identify data stored on the source media 134a-134c and/or disk cache 122a-122x to be reclaimed, i.e. read from the source media 134a-134c and/or disk cache 122a-122x and then written to the target media 134t. The data locator module 232 may further identify the state of the data to be read from the source media 134a-134c and/or disk cache 122a-122x. For example, the data locator module 232 may identify the data stored on the source media 134a-134c and/or disk cache 122a-122x as being in, for example, a pre-migrated state, a resident state, or a migrated state.

The storage media selector 234 is configured to select between the source tape media 134a-134c and/or disk cache 122a-122x from which the identified source data for reclamation is to be read and written to tape drive 132t. The storage media selector 234 may switch between source tape media 134a-134c and/or disk cache 122a-122x based on the storage location of the identified source data. For example, identified source data may be in a pre-migrated state and thus the identified source data for reclamation is stored in both a tape media 134 and a disk cache 122. In one embodiment of the invention, all identified source data for reclamation in a pre-migration state will be read from the disk cache 122a-x written to target tape media 134t by tape drive 134t and all identified source data for reclamation in a migrated state will be read from the source tape media 134a-134c by tape drive 132s and written to target media 134t by tape drive 132t.

The copy module 236 is configured to read the identified source data for reclamation from the source media 134a-134c by the source tape drive 132s and to write the identified source data to the target media 134t by the target tape drive 132t. The copy module 236 may write the identified source data for reclamation to the target media 134t after the migration of the identified source data for reclamation is completed. In a particular embodiment, files may be copied from the source media 134a-134c as the copy source to the target media 134t as the copy destination in a one by one manner by using the copy (CP) or secure copy (SCP) command.

Instead of reading from the source media 134 to the disk cache 122 to change the file state to "pre-migrated" state, the files are directly read from the source media 134a-134c. Thus, copy from the source media 134a-134c to the target media 134t is conducted while leaving the file state to be "migrated" state.

The copy module 236 may read data from the source media 134 into the cache 240 dedicated for data transfer in the reclamation, and write the read data to the target media 134t. Note that the tape drive 132 may not serve as an initiator as in the case of the extended copy for direct transfer between the drives. Two tape drives 132s and 132t are used together, and data copy is carried out between the source media 134 and the target media 134t in a one-to-one manner.

The migration module 238 is configured to migrate the migration identified source data for reclamation from the shared disk array 120 to the target media 134t by the target tape drive 132t while reading (e.g., which may include locating and/or reading) the identified source data for reclamation from the source media 134a-124c by the source tape drive 132s. In contrast to the reclamation where reading from the source media 134 strongly affects performance, writing the migration identified source data for reclamation to the target media 134t controls speed of writing the target media 134t predominantly since the reading speed from the disk cache 122 is much faster than the writing speed to the target media 134t.

Figure 5:
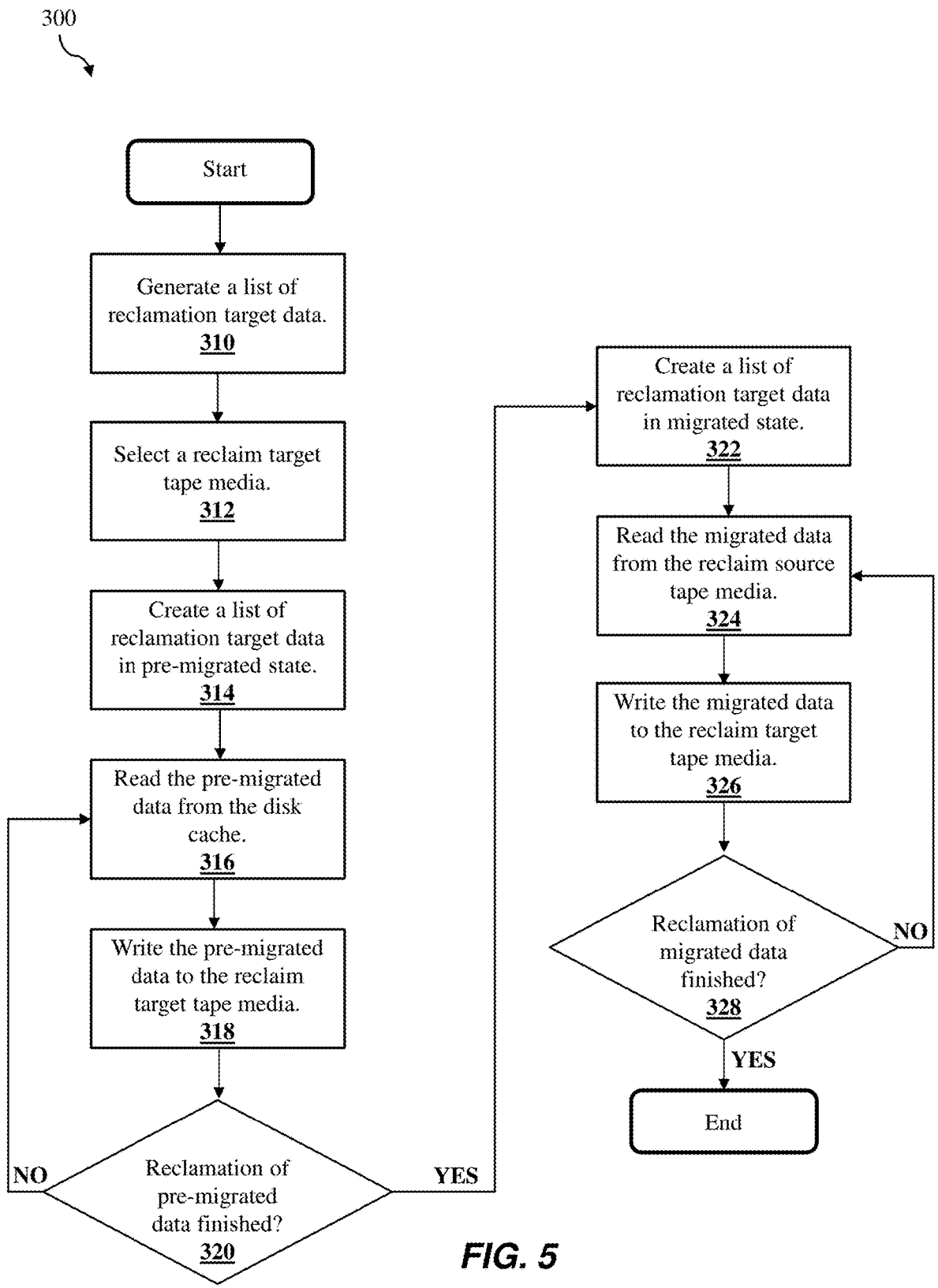
FIG. 5 is a flowchart illustrating a method for tape drive data reclamation.

Referring to FIG. 5, a method 300 for reclaiming data from a source medium to a target medium in a storage system according to an embodiment of the present invention is described.

Referring to block 310, the node 112 generates a list of data located on source tape media 134a-134c in tape library 130 to be reclaimed. The data to be reclaimed from source tape media 134a-134c may hereinafter be referred to as reclamation target data. The list of reclamation target data may be generated in response to receiving a request for reclamation from one or more users. In another embodiment of the invention, the list of reclamation target data may be generated by determining that a condition that triggers reclamation is met. For example, when the proportion of valid data on tape media 134a-134c to all data on tape media 134a-134c is lower than 35 percent, i.e. 35 percent or less of the data on tape media 134a-c is valid, the reclamation process may be automatically triggered by the node 112.

Referring to block 312, a target tape media 134t to which the reclamation target data is to be written is selected by node 112.

Referring to block 314, node 112 analyzes the generated list of reclamation target data and identifies all reclamation target data that is in a pre-migrated state.

Referring to block 316, the node 112 locates the pre-migrated reclamation target data on the disk cache 122a-122x in shared disk array 120 and reads the pre-migrated reclamation target data on the disk cache 122a-122x using the migration module 238.

Referring to block 318, the node 112 writes the pre-migrated reclamation target data of the disk cache 122a-122x to the target tape media 134t.

Referring to block 320, the node 112 determines whether the reclamation of the pre-migrated data is finished or if further pre-migrated reclamation target data on the generated list needs to be read and written to the target tape media 134t. If the node 112 determines that the reclamation is not finished and further pre-migrated reclamation target data remains to be reclaimed at block 320 (NO), then the process loops back to block 316. If the node 112 determines that all pre-migrated reclamation target data has been read and written to the target tape media 134t, the process may proceed to block 322.

Referring to block 322, node 112 analyzes the generated list of reclamation target data and identifies all reclamation target data that is in a migrated state.

Referring to block 324, the node 112 locates the migrated reclamation target data on the source tape media 134a-134c in the tape library 130 and the source tape drive 132s reads the migrated reclamation target data on the source tape media 134a-134c using the copy module 236.

Referring to block 326, the node 112 writes the migrated reclamation target data of the source tape media 134a-134c to the target tape media 134t.

Referring to block 328, the node 112 determines whether the reclamation of the migrated data is finished or if further migrated reclamation target data on the generated list needs to be read and written to the target tape media 134t. If the node 112 determines that the reclamation is not finished and further migrated reclamation target data remains to be reclaimed at block 328 (NO), then the process loops back to block 324. If the node 112 determines that all migrated reclamation target data has been read and written to the target tape media 134t, the process may proceed to end.

Figure 6:
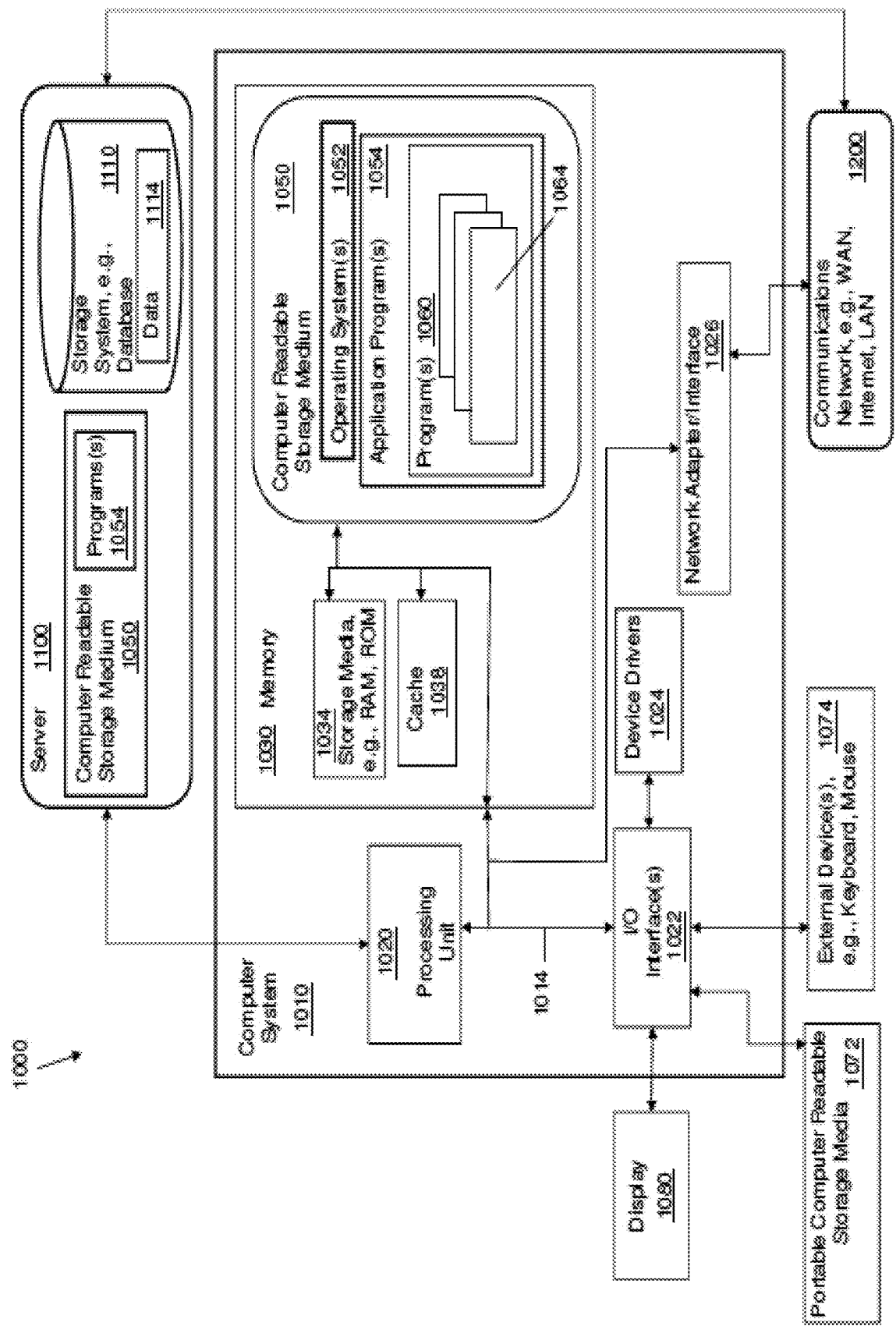
FIG. 6 is a block diagram depicting the hardware components of the data reclamation system of FIG. 1, in accordance with an embodiment of the invention.

Referring to FIG. 6, a system 1000 includes a computer system or computer 1010 shown in the form of a generic computing device. The method 300, for example, may be embodied in a program(s) 1060 (FIG. 6) embodied on a computer readable storage device, for example, generally referred to as memory 1030 and more specifically, computer readable storage medium 1050 as shown in FIG. 6. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 6 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 6 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 6, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 300 (FIG. 5), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
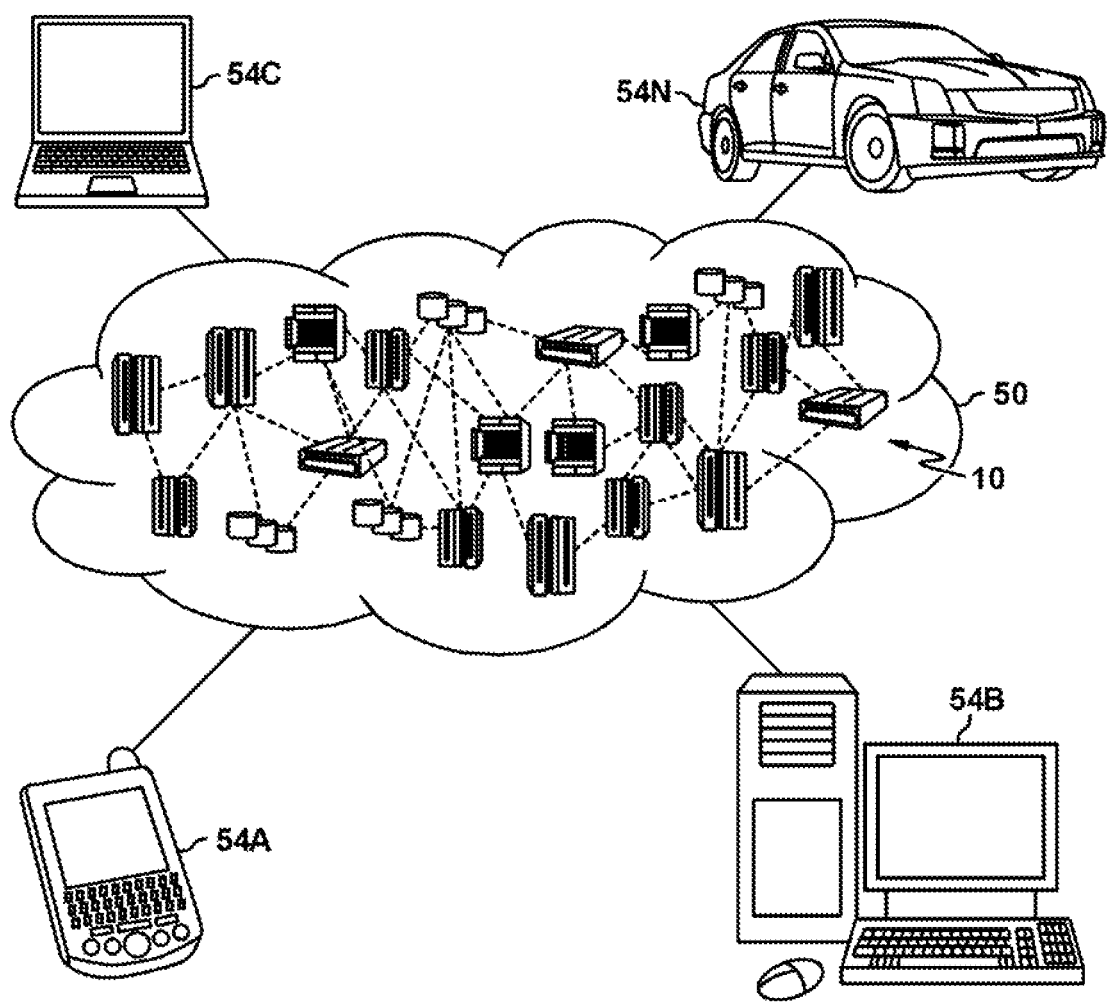
FIG. 7 illustrates a cloud computing environment, in accordance with an embodiment of the invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 8:
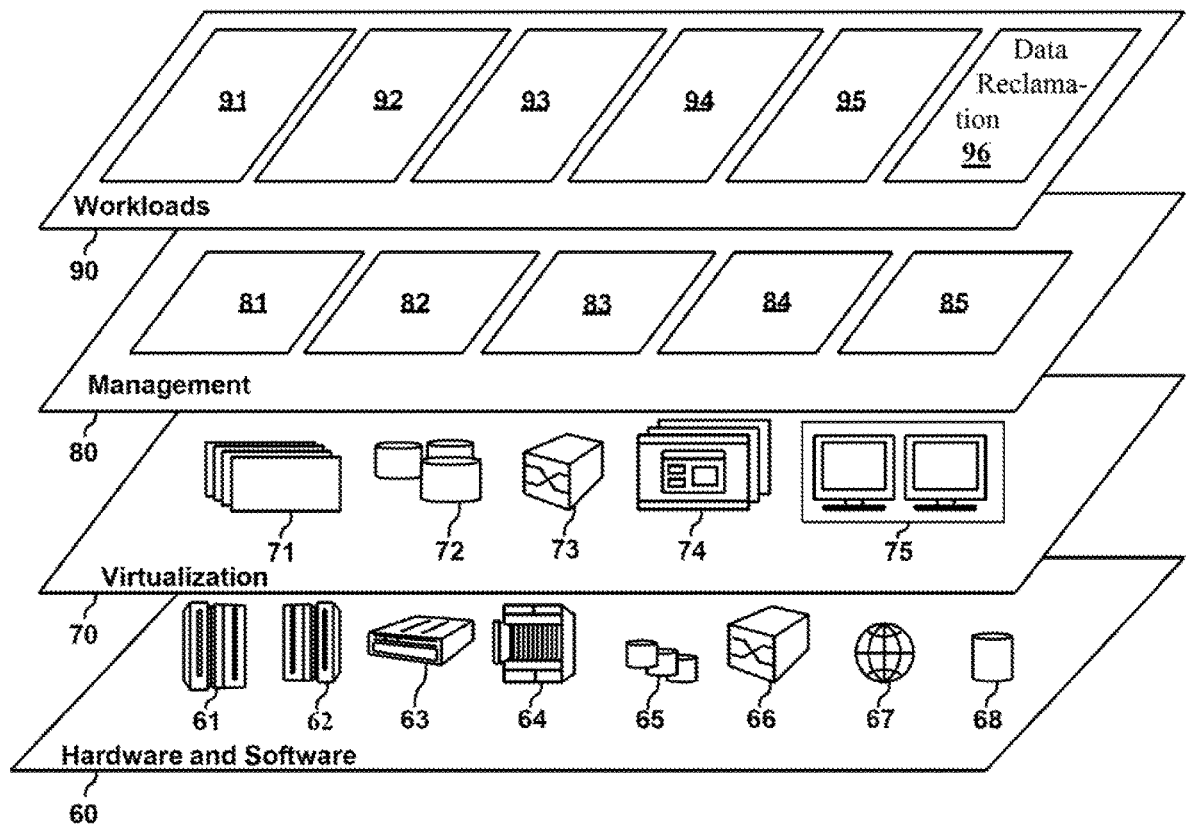
FIG. 8 illustrates a set of functional abstraction layers provided by the cloud computing environment of FIG. 7, in accordance with an embodiment of the invention.

Referring now to FIG. 8, a set of functional abstraction layers provided by cloud computing environment 50 (FIG. 7) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data reclamation 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for copying data from source media to target media in a storage system, the method comprising:
   generating a list of data to be copied from a plurality of source media to a target medium, by a node in a computer system;
   identifying, by the node, a first type of data in the generated list of data, the first type of data being pre-migrated data;
   reclaiming, by the node using a first drive, the first type of data from a primary storage tier to the target medium, the target medium associated with the first drive;
   identifying, by the node, a second type of data in the generated list of data, the second type of date being migrated data; and
   reclaiming, by the node using the first drive and a second drive, the second type of data from at least one secondary source medium on a secondary storage tier to the target medium, the at least one secondary source medium associated with the second drive.

2. A method as in claim 1, wherein the first type of data is stored on both the primary storage tier and the secondary storage tier.

3. A method as in claim 1, wherein the second type of data is stored only on the secondary storage tier.

4. A method as in claim 1, wherein reclaiming the pre-migrated data from a primary storage tier to a target medium comprises:
   reading, by the node, the pre-migrated data on the primary storage tier; and
   writing, by the first drive, the read pre-migrated data to the target medium.

5. A method as in claim 1, wherein reclaiming the migrated data from a source medium to a target medium comprises:
   reading, by the second drive, the migrated data from the at least one source medium; and
   writing, by the first drive, the migrated data to the target medium.

6. A method as in claim 1, wherein reclaiming the pre-migrated data from a primary storage tier to a target medium is 50 percent faster than reclaiming the migrated data from at least one source medium to a target medium.

7. A method as in claim 1, wherein the source medium and the target medium are tape media, wherein the first drive and the second drive are tape drives, wherein the primary storage tier is a disk tier in a hierarchical storage system, and wherein the tape drives constitute a tape media tier in the hierarchical storage system.

8. A computer program product for copying data from source media to target media in a storage system, the computer program product comprising:
   a computer-readable storage medium having program instructions embodied therewith, wherein the computer readable storage medium is not a transitory signal per se, the program instructions executable by a computer to cause the computer to perform a method, comprising:
   generating a list of data to be copied from a plurality of source media to a target medium, by a node in a computer system;
   identifying, by the node, a first type of data in the generated list of data, the first type of data being pre-migrated data;

reclaiming, by the node using a first drive, the first type of data from a primary storage tier to the target medium, the target medium associated with the first drive;

identifying, by the node, a second type of data in the generated list of data, the second type of date being migrated data; and reclaiming, by the node using the first drive and a second drive, the second type of data from at least one secondary source medium on a secondary storage tier to the target medium, the at least one secondary source medium associated with the second drive.

9. The computer program product as in claim 8, wherein the first type of data is stored on both the primary storage tier and the secondary storage tier.

10. The computer program product as in claim 8, wherein the second type of data is stored only on the secondary storage tier.

11. The computer program product as in claim 8, wherein reclaiming the pre-migrated data from a primary storage tier to a target medium comprises:

reading, by the node, the pre-migrated data on the primary storage tier; and writing, by the first drive, the read pre-migrated data to the target medium.

12. The computer program product as in claim 8, wherein reclaiming the migrated data from a source medium to a target medium comprises:

reading, by the second drive, the migrated data from the at least one source medium; and writing, by the first drive, the migrated data to the target medium.

13. The computer program product as in claim 8, wherein reclaiming the pre-migrated data from a primary storage tier to a target medium is 50 percent faster than reclaiming the migrated data from at least one source medium to a target medium.

14. The computer program product as in claim 8, wherein the source medium and the target medium are tape media, wherein the first drive and the second drive are tape drives, wherein the primary storage tier is a disk tier in a hierarchical storage system, and wherein the tape drives constitute a tape media tier in the hierarchical storage system.

15. A system for copying data from source media to target media in a storage system, the system comprising:

a computer system comprising, a processor, a computer readable storage medium, and program instructions stored on the computer readable storage medium being executable by the processor to cause the computer system to:

generate a list of data to be copied from a plurality of source media to a target medium, by a node in a computer system;

identify, by the node, a first type of data in the generated list of data, the first type of data being pre-migrated data;

reclaim, by the node using a first drive, the first type of data from a primary storage tier to the target medium, the target medium associated with the first drive;

identify, by the node, a second type of data in the generated list of data, the second type of date being migrated data; and reclaim, by the node using the first drive and a second drive, the second type of data from at least one secondary source medium on a secondary storage tier to the target medium, the at least one secondary source medium associated with the second drive.

16. A computer system as in claim 15, wherein the first type of data is stored on both the primary storage tier and the secondary storage tier.

17. A computer system as in claim 15, wherein the second type of data is stored only on the secondary storage tier.

18. A computer system as in claim 15, wherein the program instruction to reclaim the pre-migrated data from a primary storage tier to a target medium comprises program instruction to:

read, by the node, the pre-migrated data on the primary storage tier; and write, by the first drive, the read pre-migrated data to the target medium.

19. A computer system as in claim 15, wherein the program instruction to reclaim the migrated data from a source medium to a target medium comprises program instruction to:

read, by the second drive, the migrated data from the at least one source medium; and write, by the first drive, the migrated data to the target medium.

20. A computer system as in claim 15, wherein reclaiming the pre-migrated data from a primary storage tier to a target medium is 50 percent faster than reclaiming the migrated data from at least one source medium to a target medium.

* * * * *